United States Patent
Wagner

(10) Patent No.: US 7,469,975 B2
(45) Date of Patent: Dec. 30, 2008

(54) SLIP CONTROL SYSTEM FOR A SINGLE-TRACK MOTOR VEHICLE

(75) Inventor: Hans-Albert Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/882,061

(22) Filed: Jul. 30, 2007

(65) Prior Publication Data

US 2008/0001478 A1   Jan. 3, 2008

Related U.S. Application Data

(63) Continuation of application No. PCT/EP2005/012930, filed on Dec. 2, 2005.

(30) Foreign Application Priority Data

Jan. 28, 2005   (DE) .................. 10 2005 003 980

(51) Int. Cl.
*B60T 8/32* (2006.01)

(52) U.S. Cl. ............ 303/191; 303/9.64; 303/137; 303/192; 701/82

(58) Field of Classification Search ............ 303/191, 303/9.64, 122.09, 121, 122, 137, 163, 165, 303/177, 192; 701/78, 79, 82, 83, 84; 180/197
See application file for complete search history.

(56) References Cited

U.S. PATENT DOCUMENTS

| | | | |
|---|---|---|---|
| 5,067,778 A | 11/1991 | Testardi | |
| 5,411,325 A | 5/1995 | Tanaka et al. | |
| 5,445,443 A | 8/1995 | Hauser et al. | |
| 5,774,821 A * | 6/1998 | Eckert | 701/78 |
| 2006/0267750 A1* | 11/2006 | Lu et al. | 340/440 |
| 2007/0112477 A1 | 5/2007 | Van Zanten et al. | |

FOREIGN PATENT DOCUMENTS

| | | |
|---|---|---|
| DE | 38 39 520 A1 | 5/1990 |
| DE | 39 33 294 A1 | 4/1991 |
| DE | 41 12 738 C2 | 10/1992 |

(Continued)

OTHER PUBLICATIONS

International Search Report dated Jul. 18, 2006 with English translation of relevant portion (Six (6) pages).

(Continued)

*Primary Examiner*—Pam Rodriguez
(74) *Attorney, Agent, or Firm*—Crowell & Moring LLP

(57) ABSTRACT

A slip control system is provided for a single-track motor vehicle, including devices for detecting the wheel revolution of the front and rear wheel of the motor vehicle, devices for detecting a tilting position angle of the motor vehicle, as well as devices for influencing the driving and/or braking forces acting upon a wheel of the motor vehicle. In addition, devices are provided for storing type-specific tire data, and the devices for influencing the driving and/or braking forces acting upon a vehicle wheel are constructed such that the influencing of the driving and/or braking forces takes place as a function of the type-specific tire data, in particular the different geometries of the front and rear wheel tires.

12 Claims, 1 Drawing Sheet

FOREIGN PATENT DOCUMENTS

| | | |
|---|---|---|
| DE | 42 44 112 C2 | 6/1994 |
| DE | 196 51 968 A1 | 6/1998 |
| DE | 693 28 393 T2 | 8/2000 |
| DE | 199 08 481 A1 | 9/2000 |
| DE | 102 22 199 A1 | 11/2003 |
| DE | 102 35 378 A1 | 2/2004 |
| DE | 103 20 828 A1 | 12/2004 |
| WO | WO 01/76925 A1 | 10/2001 |

OTHER PUBLICATIONS

German Office Action dated Sep. 1, 2005 with English translation (Eight (8) pages).

* cited by examiner

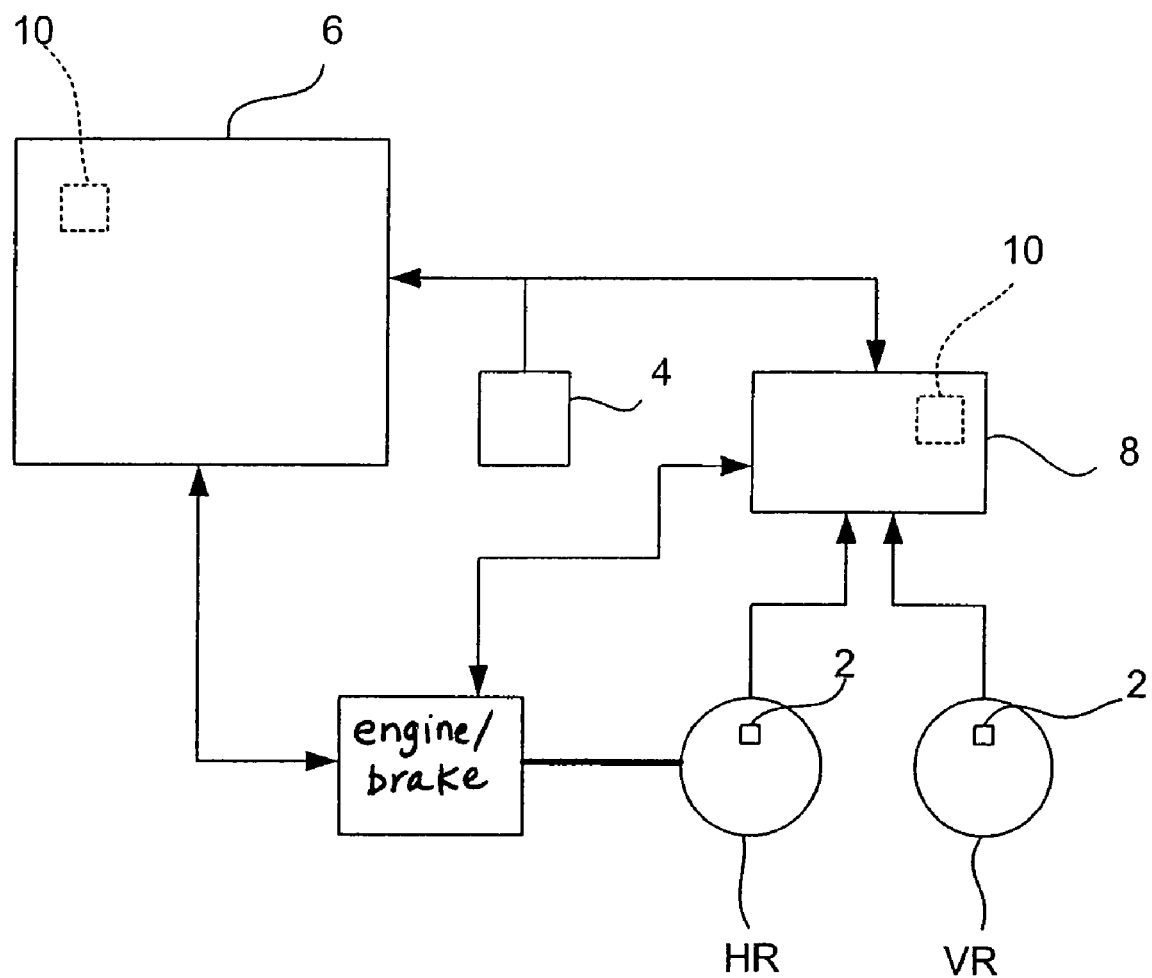

SLIP CONTROL SYSTEM FOR A SINGLE-TRACK MOTOR VEHICLE

CROSS-REFERENCE TO RELATED APPLICATIONS

This application is a continuation of PCT International Application No. PCT/EP2005/012930, filed on Dec. 2, 2005, which claims priority under 35 U.S.C. §119 to German Application No. 10 2005 003 980.4, filed Jan. 28, 2005, the entire disclosures of which are expressly incorporated by reference herein.

BACKGROUND AND SUMMARY OF THE INVENTION

The invention relates to a slip control system for a single-track motor vehicle, particularly to a slip control for a motorcycle.

Conventional slip control systems are sufficiently known in the form of antilock brake control systems (ABS) and wheel slip control system (ASR wheel slip control, ASC automatic stability control). By means of antilock systems, a locking of the wheels is prevented during a braking operation, whereas, in the case of a so-called antislip system, the unintended spinning of a driving wheel is avoided during an acceleration operation. Both systems are based on the control (deviation control) of a slip between at least two wheels (wheel speeds) to be compared.

From German Patent document DE 42 44 112 C2, a slip control system in the form of an antilock system for motorcycles is known, in which the tilting angle of the motorcycle during cornering is determined and, if the latter exceeds a predefined value, the antilock control device is caused, via control signals, to limit the braking pressure at the front wheel to a value which is lower than the locking pressure to be expected. As the tilting position increases, the braking pressure is reduced to a continuously lower value. As a result, a locking protection control which dynamically adapts itself to the degree of the reached tilting position is achieved.

Furthermore, from German Patent document DE 102 35 378 A1, a method is known for controlling the brake on a single-track motor vehicle, in the case of which a side tilt is detected by use of a yaw rate sensor and a brake control takes place as a function of the detected side tilt.

The sensors used for determining the tilting positions, which are sufficiently known in the state of the art, will not be discussed in detail in the following.

The present invention provides a slip control system for a single-track motor vehicle, which is improved with respect to the slip control during a side tilt (tilting position) of the vehicle. The invention recognizes that the wheel slip signals of the front and rear wheel in the case of a single-track vehicle, particularly in the tilting position of the vehicle, are distorted due to the different tire geometries of the front-wheel and rear-wheel tires.

According to the invention, a slip control system for a single-track vehicle is provided that includes devices for detecting the wheel revolutions of the front and rear wheel of the motor vehicle, devices for detecting a tilting position angle of the motor vehicle, as well as devices for influencing the driving and/or braking forces acting upon a wheel of the motor vehicle. Devices for storing tire-type-specific data, which correlate with the lateral rolling radius of the tires are also provided. The devices for influencing the driving and/or braking forces acting upon a vehicle wheel are constructed such that the influencing of the driving and/or braking forces takes place as a function of the tire-type-specific data and the detected tilting position angle, and that an error slip is taken into account which occurs in a tilting position only as a result of the different tire geometries of the front and rear wheel.

According to the invention, at least data for a tire pairing (front and rear wheel) are stored in a memory. However, since usually several tire releases exist for a vehicle, preferably a plurality of tire pairings are stored in the data memory. The pairing of tires actually mounted on the vehicle (or the pairing which is most similar to the actually mounted tire pairing with respect to its relevant data) can either be selected or set by an authorized person, or is automatically recognized by the vehicle at the start of the operation and is used as the basis for the control according to the invention. As a result of the stored data, by way of devices for influencing the driving and/or braking forces acting upon one or both wheels of the vehicle (or all wheels of the single-track vehicle), an improved slip control can take place. The slip control is, in particular, improved in that now a more precise determination of limit values for permissible maximal braking pressures (in the antilock system operation) or permissible maximal acceleration values (in the wheel slip control operation) becomes possible.

For example, when a motorcycle is cornering in a tilting position, solely as a result of the different tire geometries of the front and rear wheel, a slip (in the following called "error slip") will occur which, so far, had not been taken into account in the state of the art. When cornering with a modern motorcycle, for example, such as a Sporttourer (for example, the BMW R 1100 S) with a tilting position or an angle of tilt of, for example, 45° without an engine drive or braking effect, a speed error of approximately 6% should be expected, by which the rear wheel rotates faster than the front wheel. Because of this error slip, limit values to be calculated, for example, a maximally permissible braking pressure or a maximally permissible acceleration (engine torque) for a corresponding tilting position, are distorted.

In the case of a slip control system according to the invention, as a result of taking into account the different tire geometries of the front wheel and the rear wheel, an error slip occurring in this manner is extracted by calculation, so that the calculation of limit values for an acceleration and/or deceleration of the vehicle during this tilting position, which is corrected by this error slip, supplies considerably more precise limit values for the maximally permissible acceleration or deceleration. If this error slip were not taken into account, in a first consideration of the limit, possibly unacceptably high deceleration or acceleration limit values would be determined, which could cause a reduced acceleration stability because of the reduction of the lateral stability and thus a sideslipping of the motorcycle, or, in a second consideration of the limit, the determined uncorrected deceleration or acceleration values would cause a reduced acceleration efficiency.

The devices for storing the tire data, which preferably are constructed as conventional memories, contain type-specific tire data at least with information concerning rolling radii and/or information concerning the type of tire used (by which conclusions can be drawn on the tread rolling radii).

The slip control system according to the invention is preferably used in an antilock system, a wheel slip control system or a control system of a motorcycle which combines these two systems.

Other objects, advantages and novel features of the present invention will become apparent from the following detailed description of the invention when considered in conjunction with the accompanying drawings.

BRIEF DESCRIPTION OF THE DRAWING

The FIGURE is a block diagram illustrating a slip control system for a motorcycle according to the invention.

DETAILED DESCRIPTION OF THE DRAWING

Referring to the FIGURE, the slip control system according to the invention includes devices 2 (in the following called rotational-speed sensors) for detecting the wheel revolutions (rotational wheel speed) of the front and rear wheel (VR, HR); devices 4 (in the following called tilt detectors or tilt sensors) for detecting the angle of tilt or inclination of the motorcycle; as well as control devices 6 (for example, the engine control, the brake control, or the like) for controlling the driving and/or braking forces acting upon at least one wheel of the motorcycle by way of the engine or the brake. During a braking operation while cornering, for example, braking forces are correspondingly controlled or automatically controlled. During an acceleration operation while cornering, for example, the wheel circumference torques being controlled and/or automatically controlled by engine torques are possibly braking torques.

In the case of such a system, in a conventional manner, the speed of each individual wheel, and thus the corresponding vehicle speed, is determined from the data of the two rotational-speed sensors 2 of the front and rear wheel (reading-in of rotational wheel speed pulses) in connection with a given wheel diameter or radius. This vehicle speed is provided to the control system (the control systems)—represented here by the control components of an engine control 6 with an integrated wheel slip control and a separate antilock system control 8—for further processing.

In the event of a cornering in a tilting position, by way of a tilt detector 4 (which, in a known manner, may be formed by yaw rate and/or acceleration sensors), a tilting position of the motorcycle is detected and a corresponding angle of tilt is determined. When now, during this cornering in the tilting position, the braking system is activated, as a function of the existing tilting position and the determined slip between the front wheel and the rear wheel, a maximal braking pressure is determined, which must not be exceeded during the automatically controlled braking when cornering. During the determination of the slip between the front wheel and the rear wheel or when determining the above-mentioned limit value, according to the invention, the error slip in the tilting position, which exists because of the type of tires used, is taken into account (extracted by calculation) and stored in a device 10 during the determination and, as a result, a limit value for a maximally permissible braking pressure for a corresponding tilting position is determined, which limit value is corrected with respect to the error.

The determination of a limit value (here: of an acceleration limit value for accelerating during cornering in a tilting position of the vehicle) for a wheel slip control system takes place analogously. Here, it is to be prevented that an excessive torque for accelerating the motorcycle during a cornering in the tilting position is transmitted to the driving wheel. Here also, according to the invention, the limit value (here: maximal acceleration torque), corrected by the error slip occurring in the tiling position because of the different tire geometries of the front and rear wheel, is determined in a most precise manner. Based on the wheel speed and vehicle speed determined by the rotational speed sensors 2 and the slip between the rear wheel and the front wheel determined therefrom, as a function of the vehicle tilt during a cornering determined by the tilt detectors 4, and as a function of the type of tire that was used (tire data) and the error slip thereby determined, a limit value for the vehicle acceleration is determined, which is corrected with respect to the error. A spinning of the rear wheel and, therefore, a sideslipping during the cornering because of an excessive acceleration is clearly corrected by the invention.

As a further development of the invention, the tilt detector 4 of the slip control system include devices for detecting the steering angle. The actual angle of tilt is preferably determined as a function of signals from at least one steering angle sensor in combination with at least one yaw rate sensor and/or an acceleration sensor. As a result of this combination of sensors, the angle of tilt of a motorcycle during cornering in a tilting position can be determined in a very precise manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A slip control system for a single-track motor vehicle, comprising:
    first devices for detecting wheel revolutions of a front and a rear wheel of the motor vehicle;
    second devices for detecting a tilting position angle of the motor vehicle;
    third devices for influencing at least one of driving and braking forces acting upon at least one of the front and the rear wheel of the motor vehicle;
    a fifth device for storing tire-type-specific data, which data correlate with a lateral rolling radius of tires of the vehicle; and
    wherein the third devices for influencing at least one of the driving and braking forces acting upon the at least one wheel are operatively configured such that the influencing takes place as a function of the tire-type-specific data and a detected tilting position angle, and further wherein an error slip is factored into account, which error slip occurs in a side tilting position due to different tire geometries of the front and the rear wheel.

2. The slip control system according to claim 1, wherein the third devices for influencing the at least one of the driving and braking forces acting upon the vehicle wheel are operatively configured such that, as a result of the error slip, a limit value for a maximally permissible braking pressure or for a maximally permissible acceleration torque is determined, which limit value is corrected with respect to the error.

3. The slip control system according to claim 2, wherein the fifth device for storing the tire-type-specific data stores data concerning a rolling radii of at least one of the front and the rear wheel.

4. The slip control system according to claim 2, wherein the slip control system is incorporated into one of an anti-lock system, a wheel slip control system, and a combined anti-lock-wheel slip control system.

5. The slip control system according to claim 1, wherein the fifth device for storing the tire-type-specific data stores data concerning a rolling radii of at least one of the front and the rear wheel.

6. The slip control system according to claim 1, wherein the slip control system is incorporated into one of an anti-lock system, a wheel slip control system, and a combined anti-lock-wheel slip control system.

7. The slip control system according to claim 1, wherein the second devices comprise a steering angle sensor for detecting handle bar motion of the motor vehicle.

8. A method of operating a slip control system for a single-track motor vehicle having a front and a rear wheel, the method comprising the acts of:
   detecting a tilting position angle of the vehicle;
   storing at least tire geometry data related to tires of the front and the rear wheel;
   determining an error slip occurring in a side tilting position of the vehicle only as a result of different tire geometries of the front and the rear wheel; and
   influencing at least one of driving and braking forces acting upon the vehicle as a function of the detected side tilting position and the error slip.

9. The method according to claim 8, wherein the act of influencing further comprises the act of determining a limit value for a maximally permissible braking pressure or a maximally permissible acceleration torque, the limit value being corrected in accordance with the error slip.

10. The method according to claim 9, wherein the act of storing the tire geometry data stores at least data concerning a rolling radii of at least one of the front and the rear wheel.

11. The method according to claim 10, wherein the act of detecting the tilting position angle comprises the act of detecting handle bar motion of the vehicle via a steering angle sensor.

12. A method of determining a limit value for a slip control system used in a single-track motor vehicle having a front and a rear wheel, the method comprising the acts of:
   receiving tire geometry data with respect to the front wheel tire and the rear wheel tire;
   calculating an error slip in another vehicle parameter utilized in the slip control system, which error slip is a function of the different tire geometries of the front wheel and the rear wheel; and
   calculating a limit value for at least one of an acceleration and deceleration of the vehicle during a tilting position, which limit value is corrected for the error slip.

* * * * *